US009590745B2

(12) United States Patent
Huang et al.

(10) Patent No.: US 9,590,745 B2
(45) Date of Patent: Mar. 7, 2017

(54) SCHEME FOR PERFORMING BEAMFORMING CALIBRATION BY MEASURING JOINT SIGNAL PATH MISMATCH

(71) Applicant: MEDIATEK INC., Hsin-Chu (TW)

(72) Inventors: Yen-Lin Huang, Hsinchu County (TW); Hsiang-Hui Chang, Miaoli County (TW); Hung-Tao Hsieh, Hsinchu County (TW); Gary A. Anwyl, Palo Alto, CA (US); Thomas Edward Pare, Jr., Mountain View, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/923,445

(22) Filed: Oct. 27, 2015

(65) Prior Publication Data

US 2016/0149652 A1 May 26, 2016

Related U.S. Application Data

(60) Provisional application No. 62/082,227, filed on Nov. 20, 2014, provisional application No. 62/104,205, filed on Jan. 16, 2015.

(51) Int. Cl.

| | |
|---|---|
| ***H04B 7/06*** | (2006.01) |
| ***H04B 17/14*** | (2015.01) |
| ***H04B 7/04*** | (2006.01) |
| *H04L 25/02* | (2006.01) |

(52) U.S. Cl.
CPC ........... *H04B 17/14* (2015.01); *H04B 7/0413* (2013.01); *H04B 7/0617* (2013.01); *H04L 25/0202* (2013.01)

(58) Field of Classification Search
CPC .... H04B 7/0617; H04B 17/14; H04L 25/0202
USPC .......................................................... 375/221
See application file for complete search history.

(56) References Cited

U.S. PATENT DOCUMENTS

| | | | |
|---|---|---|---|
| 7,010,059 | B2 | 3/2006 | Song et al. |
| 7,206,354 | B2 | 4/2007 | Wallace et al. |
| 7,236,750 | B2 | 6/2007 | Vaidyanathan et al. |
| 7,280,619 | B2 | 10/2007 | Nemer et al. |
| 7,356,103 | B2 | 4/2008 | Nishikawa |
| 7,409,191 | B2 | 8/2008 | Azuma |
| 7,486,740 | B2 | 2/2009 | Inanoglu |
| 7,570,923 | B2 | 8/2009 | Kiss et al. |
| 7,643,852 | B2 | 1/2010 | Noll et al. |
| 7,848,444 | B2 | 12/2010 | Yamaura |
| 7,986,755 | B2 | 7/2011 | Tung |
| 8,014,366 | B2 | 9/2011 | Wax et al. |
| 8,442,138 | B2 | 5/2013 | Zhang et al. |
| 8,543,070 | B2 | 9/2013 | Howard et al. |
| 8,797,948 | B2 | 8/2014 | Anwyl |

(Continued)

*Primary Examiner* — Michael Neff

(74) *Attorney, Agent, or Firm* — Winston Hsu; Scott Margo

(57) ABSTRACT

A method operative on a wireless transceiver device for performing beamforming calibration includes: measuring at least one joint signal response of at least one circuit loop-back between a transmitter of the wireless transceiver device and a receiver of the wireless transceiver device to determine the measurement result; and calibrating joint signal path mismatch according to the measurement result for s multiple antenna beamforming system operating on the wireless transceiver device.

35 Claims, 5 Drawing Sheets

(56) References Cited

U.S. PATENT DOCUMENTS

| | | | | |
|---|---|---|---|---|
| 2005/0141459 | A1 | 6/2005 | Li et al. | |
| 2006/0114863 | A1 | 6/2006 | Sanzgiri et al. | |
| 2008/0274712 | A1* | 11/2008 | Rofougaran | H01P 1/20372 455/333 |
| 2012/0051287 | A1* | 3/2012 | Merlin | H04B 7/0617 370/328 |
| 2013/0109448 | A1* | 5/2013 | Garrett | H04B 7/0617 455/575.7 |

* cited by examiner

SCHEME FOR PERFORMING BEAMFORMING CALIBRATION BY MEASURING JOINT SIGNAL PATH MISMATCH

CROSS REFERENCE TO RELATED APPLICATIONS

This application claims priority of U.S. provisional application Ser. No. 62/082,227 filed on Nov. 20, 2014 and U.S. provisional application Ser. No. 62/104,205 filed on Jan. 16, 2015, which are entirely incorporated herein by reference.

BACKGROUND

For a multi-input-multi-output (MIMO) system operative on a transceiver device, some currently developed schemes have been provided to perform beamforming calibration. A conventional beamforming calibration scheme relies on external instruments (that are externally connected the transceiver device) for calibrating only transmitter side or only receiver side. This conventional beamforming calibration scheme is only allowed to be performed in the process of factory calibration, and thus the cost is higher. Additionally, another conventional calibration scheme uses a beamformee with sounding packets to perform beamforming calibration. However, this scheme would significantly increase network overheads, and also this scheme is only allowed to be performed in the process of factory calibration.

SUMMARY

Therefore one of the objectives of the present invention is to provide a novel scheme for performing beamforming calibration upon a wireless transceiver device.

According to embodiments of the present invention, a method operative on a wireless transceiver device for performing beamforming calibration is disclosed. The method comprises: measuring joint signal response of at least one circuit loopback from a transmitter of the wireless transceiver device to a receiver of the wireless transceiver device to determine a measurement result; and calibrating joint signal path mismatch according to the measurement result for a multiple antennas beamforming system operating on the wireless transceiver device.

According to embodiments of the present invention, a wireless transceiver device for performing beamforming calibration is disclosed. The wireless transceiver device comprises a transceiver integrated circuit including a transmitter, a receiver, and a calibration circuit. The calibration circuit is coupled to the transmitter and the receiver and used for measuring joint signal response of at least one circuit loopback from the transmitter to the receiver to determine a measurement result, and for calibrating joint signal path mismatch according to the measurement result for a multiple antennas beamforming system operating on the wireless transceiver device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
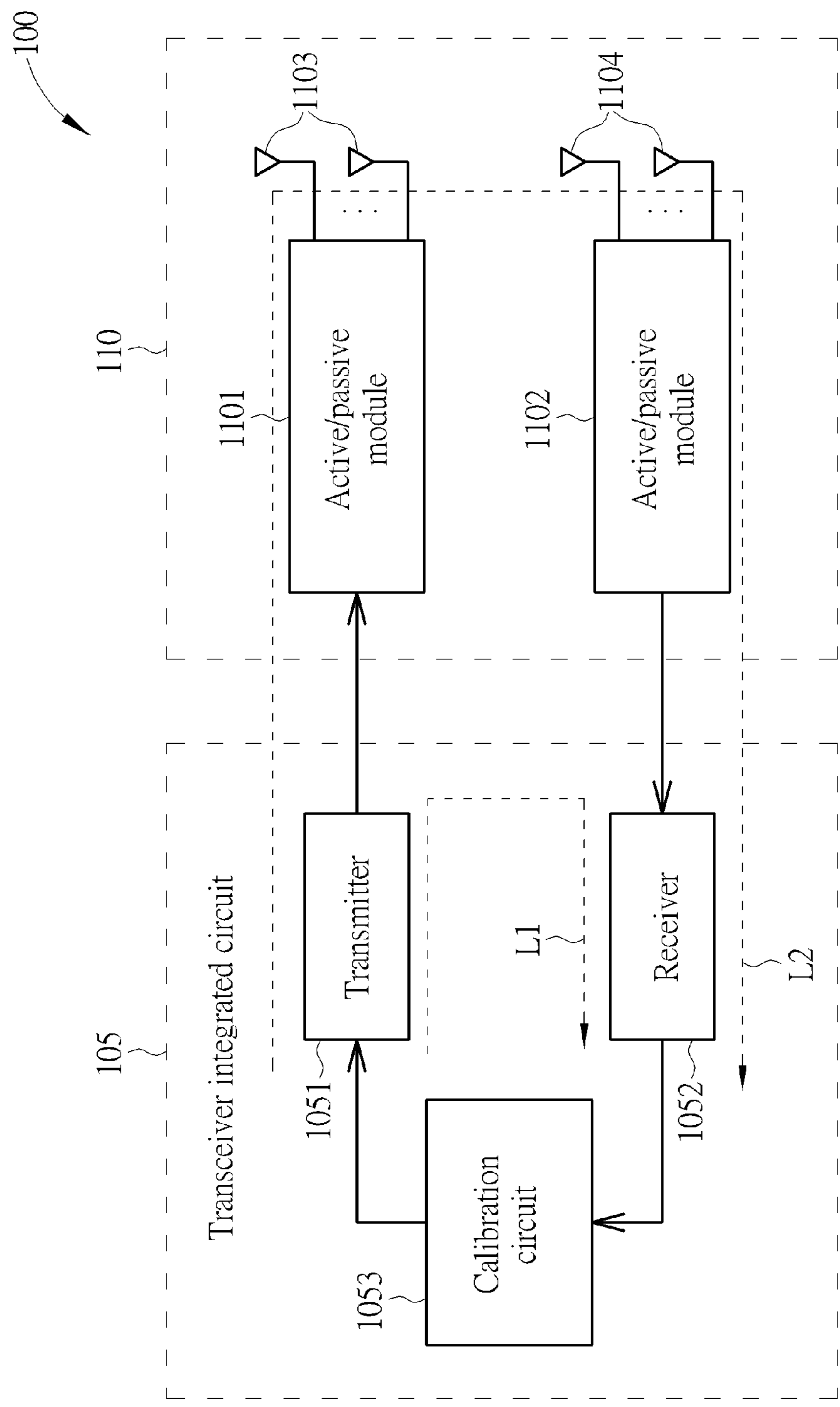
FIG. 1 is a diagram of a wireless transceiver device according to embodiments of the present invention.

Please refer to FIG. 1, which is a diagram of a wireless transceiver device 100 according to embodiments of the present invention. The wireless transceiver device 100 supports a multi-input-multi-output (MIMO) system and comprises a transceiver integrated circuit 105 and an on-board circuitry 110. The MIMO system is a multiple antenna beamforming system which is for directional signal transmission/reception. The transceiver integrated circuit 105 comprises a transmitter 1051, a receiver 1052, and a calibration circuit 1053. The on-board circuitry 110 comprises at least one pair of active/passive modules 1101 & 1102 and multiple antenna elements 1103 & 1104 at transmission side and reception side. The transmitter 1051 and receiver 1052 have an inter-chip coupling. The calibration circuit 1053 is used for performing implicit beamforming calibration upon circuit elements included within the wireless transceiver device 100. The implicit beamforming calibration performed by the calibration circuit 1053 is to measure at least one of joint signal responses of at least one circuit loopback from the transmitter 1051 to the receiver 1052 for determining a measurement result and calibrate the joint signal path mismatch between each transceiver signal path according to the determined measurement result. The joint signal responses for example may comprise amplitude/phase/delay response and/or any corresponding response combination(s) such as a combination of amplitude and phase response. In this embodiment, the calibration circuit 1053 is used to measure joint amplitude and phase response of at least one circuit loopback from the transmitter 1051 to the receiver 1052 and calibrate the joint signal path mismatch between each transceiver signal path. The calibration circuit 1053 is arranged to trigger or enable the transmitter 1051 to generate and send a specific calibration signal (i.e. the specific signal for calibration) to the receiver 1052. The receiver 1052 is arranged to receive the specific calibration signal after the specific calibration signal is transmitted from the transmitter 1051 and via at least one circuit loopback. The calibration circuit 1053 is arranged to measure or detect joint amplitude and phase response of the transmitter 1051 and receiver 1052 via the circuit loopback to determine a measurement/detection result of the measuring or detecting operation. The calibration circuit 1053 is then arranged for calibrating the joint signal path mismatch according to the measurement/detection result of the measuring or detecting operation. By measuring/detecting the joint amplitude and phase response and calibrating joint signal path mismatch of the MIMO system, the operation of implicit beamforming calibration can be achieved.

It should be noted that at least one circuit loopback from the transmitter 1051 to the receiver 1052 may be different circuit loopbacks such as an internal circuit loopback and/or external on-board circuit loopback. The calibration circuit 1053 can measure at least one of signal responses of multiple different circuit loopbacks. The internal circuit loopback defined by dotted curve L1 of FIG. 1 is disposed inside an integrated circuit and includes the transmitter 1051, inter-chip coupling/routing, and the receiver 1052. The internal circuit loopback L1 excludes a circuit element being outside the integrated circuit. The external circuit loopback defined by dotted curve L2 of FIG. 1 comprises the transmitter 1051, the receiver 1052, and at least one circuit element being outside an integrated circuit. For example, the external circuit loopback L2 shown in FIG. 1 includes active/passive modules 1101 & 1102 and antenna elements 1103 & 1104 that are on circuit board and externally coupled to the transceiver integrated circuit 105. All these examples are not intended be limitations of the invention.

Figure 2A:
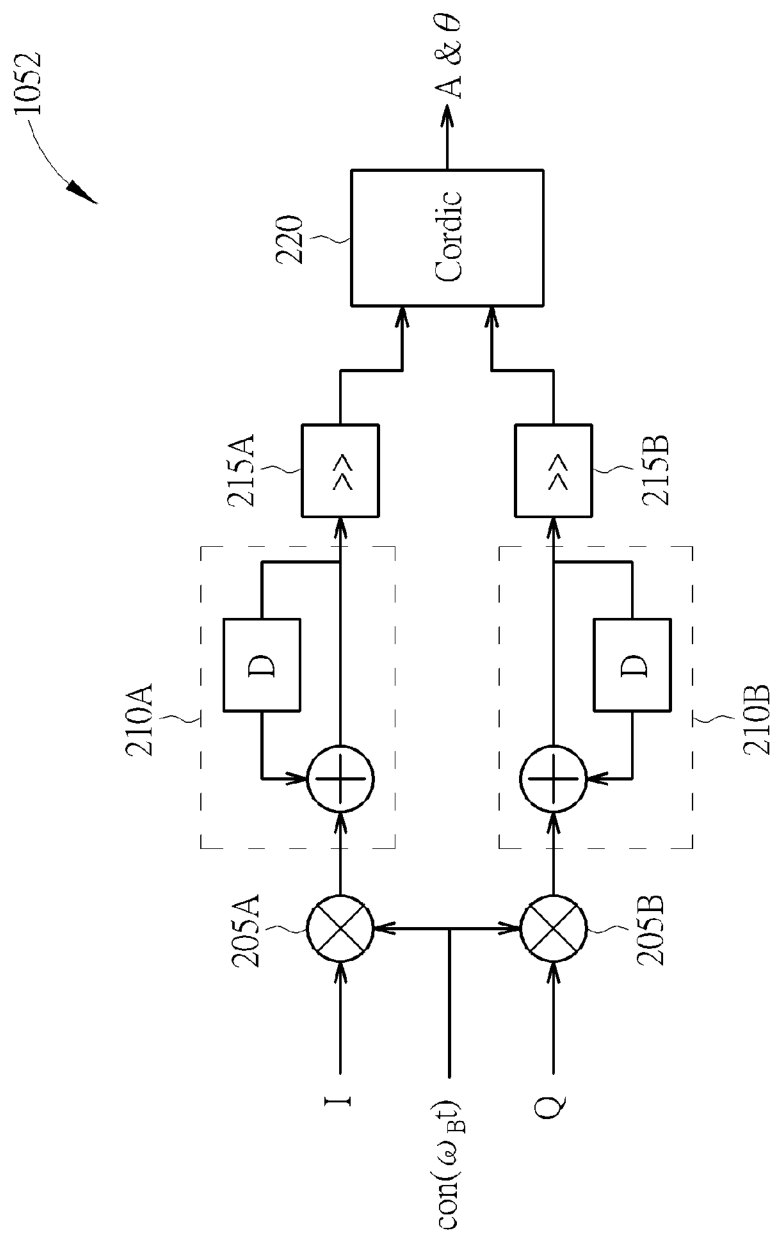
FIG. 2A is a circuit diagram corresponding to an example of double side band (DSB) down-conversion amplitude and phase detection operation of the receiver as shown in FIG. 1.
Figure 2B:
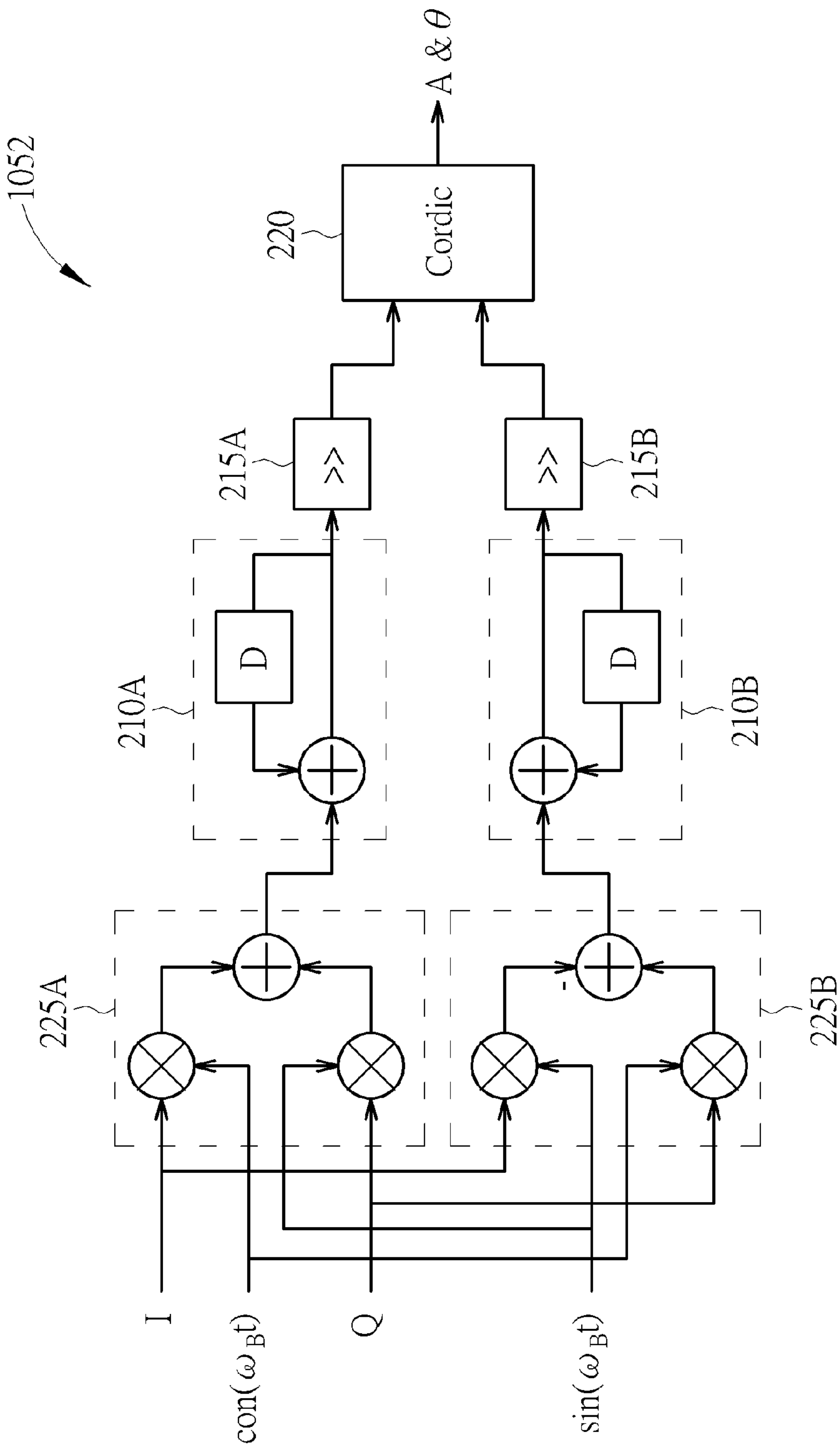
FIG. 2B is a circuit diagram corresponding to an example of single side band (SSB) down-conversion amplitude and phase detection operation of the receiver as shown in FIG. 1.
Figure 2C:
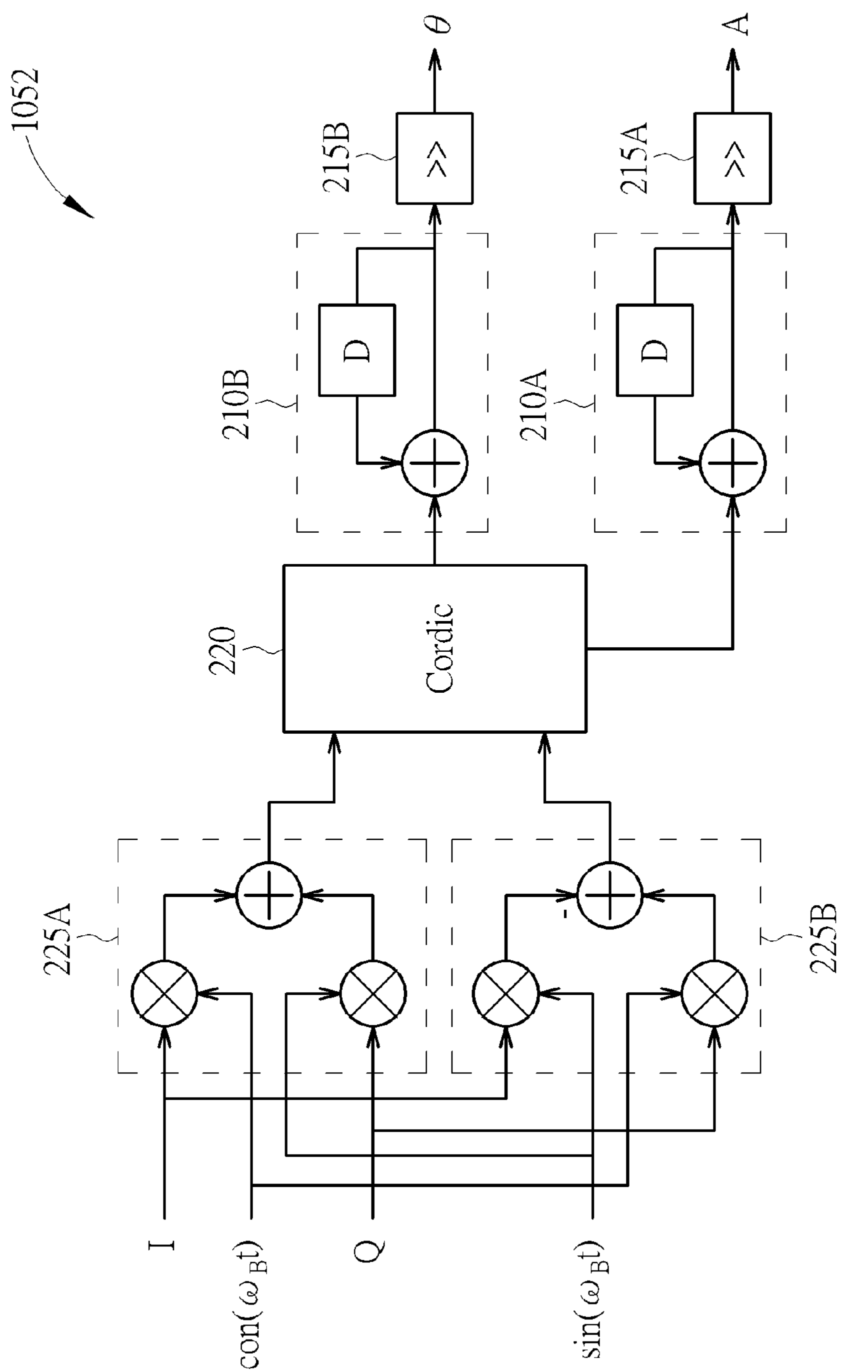
FIG. 2C is a circuit diagram corresponding to another example of single side band (SSB) down-conversion amplitude and phase detection operation of the receiver as shown in FIG. 1.

In a first embodiment, to measure the joint amplitude and phase response, the transmitter 1051 is arranged to send the specific calibration signal such as at least one tone signal to the receiver 1052 via the circuit loopback L1 and/or L2. The receiver 1052 is arranged for receiving the at least one tone signal, and then the calibration circuit 1053 can estimate the joint amplitude and phase response and calibrate the joint signal path mismatch based on the received tone signal. For example, to estimate the amplitude and phase response, a baseband circuit of the transmitter 1051 may be employed and arranged to generate and send a specific tone signal such as a complex tone signal or a real tone signal at a specific frequency for calibration. A radio-frequency circuit of the transmitter 1051 is arranged for up-converting and transmitting the specific tone signal via the above-mentioned circuit loopback L1 and/or L2. A radio-frequency circuit of the receiver 1052 may be arranged for down-converting and quantizing the specific tone signal to digital baseband to detect the specific tone signal at baseband. In an embodiment, an integrator and a shift register may be employed for performing an average process for both signal components of I and Q paths. However, this is not intended to be a limitation of the present invention. In addition, a cordic circuit may be used in the receiver 1052 for converting I/Q signal components to both amplitude and phase for detection. FIGS. 2A-2B are respectively different examples showing circuit diagrams of different down-conversion amplitude and phase detection operations of the receiver 1052 as shown in FIG. 1. FIG. 2A is a circuit diagram corresponding to an example of digital double side band (DSB) down-conversion amplitude and phase detection operation of the receiver 1052. FIG. 2B is a circuit diagram corresponding to an example of digital single side band (SSB) down-conversion amplitude and phase detection operation of the receiver 1052. FIG. 2C is a circuit diagram corresponding to another example of digital single side band (SSB) down-conversion amplitude and phase detection operation of the receiver 1052. As shown in the example of FIG. 2A, the receiver 1052 includes mixers 205A & 205B, integrators 210A & 210B, shift registers 215A & 215B, and a cordic circuit 220. The receiver 1052 employs the mentioned circuit elements and one oscillating signal to detect the amplitude A and phase θ from the I/Q signal components of the signal received from the transmitter 1051 via the circuit loop L1/L2, and correspondingly the calibration circuit 1053 can detect joint amplitude and phase response. Additionally, as shown in the example of FIG. 2B, the receiver 1052 includes mixer modules 225A & 225B, integrators 210A & 210B, shift registers 215A & 215B, and the cordic circuit 220. The receiver 1052 employs these circuit elements and quadrature oscillating signals to detect the amplitude A and phase θ from the I/Q signal components of the specific tone signal received from the transmitter 1051 via the circuit loop L1/L2, and correspondingly the calibration circuit 1053 can detect joint amplitude and phase response. Additionally, as shown in the example of FIG. 2C, the receiver 1052 includes mixer modules 225A & 225B, the integrators 210A & 210B, the shift registers 215A & 215B, and the cordic circuit 220. In this embodiment, the cordic circuit 220 is coupled between the mixer modules 225A & 225B and the integrators 210A & 210B. Therefore, according to the received specific tone signal, the calibration circuit 1053 can estimate the amplitude and phase response. A multi-tone signal is employed for calibration in other embodiments. This also falls within the scope of the present invention.

Additionally, to estimate delay response, the transmitter 1051 is arranged to send the specific calibration signal at different frequencies, and the specific calibration signal is also transmitted via the above-mentioned circuit loopback L1 and/or L2. For example, the baseband circuit of the transmitter 1051 is employed and arranged to generate and send the specific tone signal such as a complex tone signal or a real tone signal at different frequencies for calibration. The radio-frequency circuit of the transmitter 1051 is arranged for up-converting and transmitting the specific tone signal via the above-mentioned circuit loopback L1 and/or L2. The radio-frequency circuit of the receiver 1052 is arranged for down-converting and quantizing the specific tone signal at different frequencies to digital baseband to respectively detect the specific tone signal at baseband. The operation of digital down-conversion at baseband is implemented by using either a quadrature oscillating signal or a single oscillating signal. In one embodiment, the operation of digital down-conversion is implemented by using at least one of a quadrature oscillating signal and a single oscillating signal. According to the received specific tone signal at different frequencies, the calibration circuit 1053 estimates the delay response. In another embodiment, for estimating the delay response, the transmitter 1051 is arranged to send the specific calibration signal by using a multi-tone signal (complex tone signal or real tone signal). The receiver 1052 is arranged for down-converting the specific calibration signal from the transmitted circuit 1051 to detect the specific calibration signal at baseband. The operation of digital down-converting is implemented by using either a quadrature oscillating signal or a single oscillating signal. In one embodiment, the operation of digital down-conversion is implemented by using at least one of a quadrature oscillating signal and a single oscillating signal. The calibration circuit 1053 then can estimate the delay response based on the received specific signal for calibration.

The following table shows four different examples based on different baseband calibration signals of transmitter 1051, different digital down-conversion signals at baseband of receiver 1052, and corresponding calibration results:

| Example | Tx | Rx (digital down-conversion) |
|---|---|---|
| I | Complex | Complex (Quadrature) |
| II | Complex | Real (Single) |
| III | Real | Complex (Quadrature) |
| IV | Real | Real (Single) |

As mentioned above, in the first example, the transmitter 1051 is arranged to generate and send a complex tone calibration signal, and the receiver 1052 is arranged to use a quadrature oscillating signal at baseband for amplitude and phase response estimation after receiving and down-converting the complex tone calibration signal from the transmitter 1051 and via the circuit loopback L1 and/or L2. The calibration circuit 1053 estimates the joint amplitude and phase response and calibrates the joint signal path mismatch based on the complex tone calibration signal and quadrature oscillating signal at receiver baseband. Alternatively, in the second example, the transmitter 1051 is arranged to generate and send a complex tone calibration signal, and the receiver 1052 is arranged to use a single oscillating signal at baseband for amplitude and phase response estimation after receiving and down-converting the complex tone calibration signal from the transmitter 1051 and via the circuit loopback L1 and/or L2. The calibration circuit 1053 estimates the joint amplitude and phase response and calibrates the joint signal path mismatch based on the complex tone calibration signal and single oscillating signal at receiver baseband. Alternatively, in the third example, the transmitter 1051 is arranged to generate and send a real tone calibration signal, and the receiver 1052 is arranged to use a quadrature oscillating signal at baseband for amplitude and phase response estimation after receiving and down-converting the real tone calibration signal from the transmitter 1051 and via the circuit loopback L1 and/or L2. The calibration circuit 1053 estimates the joint amplitude and phase response and calibrates the joint signal path mismatch based on the real tone calibration signal and quadrature oscillating signal at receiver baseband. Alternatively, in the fourth example, the transmitter 1051 is arranged to generate and send a real tone calibration signal, and the receiver 1052 is arranged to use a single oscillating signal at baseband for amplitude and phase response estimation after receiving and down-converting the real tone calibration signal from the transmitter 1051 and via the circuit loopback L1 and/or L2. The calibration circuit 1053 estimates the joint amplitude and phase response and calibrates the joint signal path mismatch based on the real tone calibration signal and single oscillating signal at receiver baseband. Further, in the above first example, by estimating the joint amplitude and phase response and calibrating the joint signal path mismatch based on the complex tone calibration signal and quadrature oscillating signal at receiver baseband, the calibration would not be sensitive to image rejection ratio (IRR) of the transmitter 1051 and receiver 1052. The calibration operation consumes a shorter time period averagely.

Figure 3:
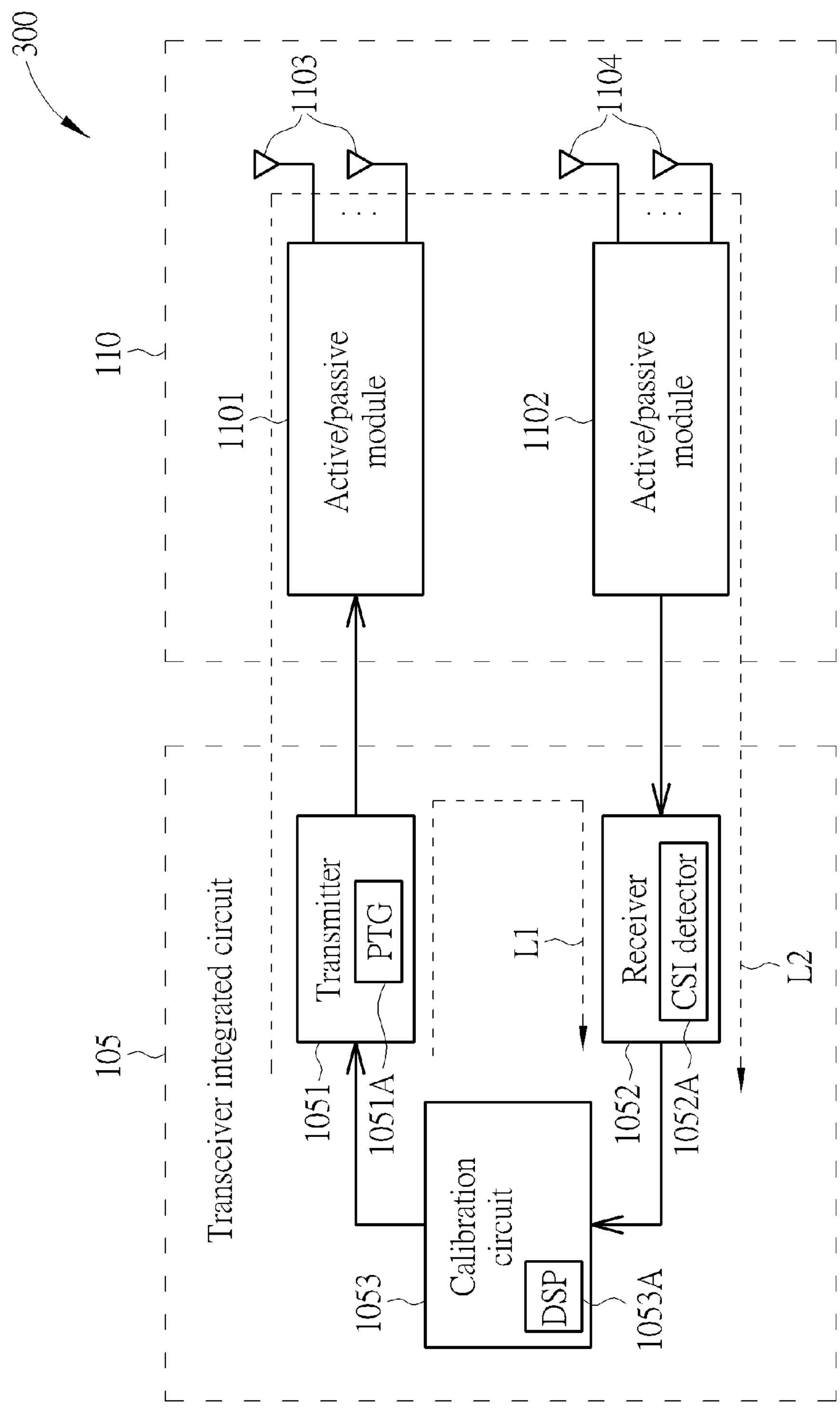
FIG. 3 is a diagram of a wireless transceiver device according to another embodiment of the present invention.

Additionally, in another embodiment, to measure amplitude/phase/delay response, the transmitter 1051 is arranged to send the specific calibration signal such as a specific modulated signal to the receiver 1052 via the circuit loopback L1 and/or L2. For example, a pattern generator is employed by the transmitter 1051 to generate and send a modulated signal. The modulated signal is transmitted via the above-mentioned circuit loopback L1 and/or L2. The receiver 1052 is arranged for receiving the at least one modulated signal to demodulate and output a demodulated signal at baseband. In practice, a channel state indication (CSI) detector is employed by the receiver 1052 to estimate the channel impulse response based on the modulated signal. Accordingly, the calibration circuit 1053 estimates the joint amplitude/phase/delay response based on the modulated signal and the channel impulse response to generate the measurement result, and then calibrates the joint signal path mismatch based on the measurement result. In addition, a digital signal processor may be employed by the calibration circuit 1053 to trigger the pattern generator to generate the modulated signal. The above-mentioned example is shown in FIG. 3. FIG. 3 is a diagram illustrating a wireless transceiver device 300 according to another embodiment of the present invention. As shown in FIG. 3, the transmitter 1051, receiver 1052, and calibration circuit 1053 respectively includes the pattern generator (PTG) 1051A, a channel state indication (CSI) detector 1052A, and a digital signal processor (DSP) 1053A. Further, the modulated signal corresponds to any kinds of modulations such as FM/AM/OFDM/CDMA/CCK (Complementary Code Keying), and so on; that is, any kinds of modulated signals in either Wi-Fi systems or cellular systems is suitable for above-mentioned embodiments.

To summarize, the present invention provides a low cost and more flexible scheme for implicit beamforming calibration to estimate the joint amplitude/phase/delay response and calibrate joint signal path mismatch between each pair of transmitter and receiver circuits. This also improves network overhead. No external instruments are required. No additional beamformee with sounding packets is required. Further, it may be not required to perform implicit beamforming calibration in the factory. This effectively saves cost of calibration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method operative on a wireless transceiver device for performing beamforming calibration, comprising:

measuring at least one joint signal response of at least one circuit loopback from a transmitter of the wireless transceiver device to a receiver of the wireless transceiver device to determine a measurement result; and calibrating at least one joint signal path mismatch according to the measurement result for a multiple antenna beamforming system operating on the wireless transceiver device;

wherein the at least one circuit loopback comprises the transmitter, the receiver, and at least one circuit element, the at least one circuit element being outside an integrated circuit.

2. The method of claim 1, wherein the step of measuring the at least one joint signal response comprises:

measuring the at least one joint signal response of a plurality of circuit loopbacks between a plurality of pairs of antenna elements within the wireless transceiver device.

3. The method of claim 1, wherein the step of measuring the at least one joint signal response comprises:

using the transmitter to send at least one specific signal for calibration via the at least one circuit loopback;

using the receiver to receive the at least one specific signal via the at least one circuit loopback; and estimating the at least one joint signal response according to the received at least one specific signal.

4. The method of claim 3, wherein the at least one specific signal for calibration is at least one of a single-tone signal and a multi-tone signal.

5. The method of claim 3, wherein the step of sending the at least one specific signal for calibration is implemented by using at least one of a complex tone signal and a real tone signal.

6. The method of claim 5, wherein the step of receiving the at least one specific signal for calibration is implemented by using at least one of a quadrature oscillating signal and a single oscillating signal at receiver baseband.

7. The method of claim 1, wherein the at least one specific signal for calibration is a modulated signal generated by the transmitter.

8. The method of claim 7, wherein the step of measuring the at least one joint signal response comprises:

using a pattern generator for generating the modulated signal; and using a channel state indication detector for estimating a channel impulse response based on the modulated signal, so as to measure the at least one joint signal response; and the step of calibrating the at least one joint signal path mismatch comprises:

calibrating the at least one joint signal path mismatch according to the demodulated signal and the estimated channel impulse response.

9. The method of claim 1, wherein the at least one joint signal response comprises at least one of amplitude/phase/delay response, a combination of amplitude and phase response, and any corresponding response combination.

10. A wireless transceiver device for performing beamforming calibration, comprising:

a transceiver integrated circuit, including:

a transmitter;

a receiver; and a calibration circuit, coupled to the transmitter and the receiver, for measuring at least one joint signal response of at least one circuit loopback from the transmitter to the receiver to determine a measurement result, and for calibrating at least one joint signal path mismatch according to the measurement result for a multiple antenna beamforming system operating on the wireless transceiver device;

wherein the wireless transceiver device is coupled to at least one circuit element outside the transceiver integrated circuit, and the at least one circuit loopback comprises the transmitter, the receiver, and the at least one circuit element outside the transceiver integrated circuit.

11. The wireless transceiver device of claim 10, wherein the calibration circuit is arranged for measuring the at least one joint signal response of a plurality of circuit loopbacks between a plurality of pairs of antenna elements within the wireless transceiver device.

12. The wireless transceiver device of claim 10, wherein the transmitter is arranged to send at least one specific signal for calibration via the at least one circuit loopback; the receiver is arranged to receive the at least one specific signal via the at least one circuit loopback; and, the calibration is arranged for estimating the at least one joint signal response according to the received at least one specific signal.

13. The wireless transceiver device of claim 12, wherein the at least one specific signal for calibration is at least one of a single-tone signal and a multi-tone signal.

14. The wireless transceiver device of claim 12, wherein the transmitter is arranged for sending the at least one specific signal for calibration by using at least one of a complex tone signal and a real tone signal.

15. The wireless transceiver device of claim 14, wherein the receiver is arranged for receiving the at least one specific signal for calibration by using at least one of a quadrature oscillating signal and a single oscillating signal.

16. The wireless transceiver device of claim 10, wherein the at least one specific signal for calibration is a modulated signal generated by the transmitter.

17. The wireless transceiver device of claim 16, wherein the transmitter comprises a pattern generator for generating the modulated signal; the receiver comprises a channel state indication detector for estimating a channel impulse response based on the modulated signal; and, the calibration circuit calibrates the at least one joint signal path mismatch according to the demodulated signal and the estimated channel impulse response.

18. The wireless transceiver device of claim 10, wherein the at least one joint signal response comprises at least one of amplitude/phase/delay response, a combination of amplitude and phase response, and any corresponding response combination.

19. A method operative on a wireless transceiver device for performing beamforming calibration, comprising:

measuring at least one joint signal response of at least one circuit loopback from a transmitter of the wireless transceiver device to a receiver of the wireless transceiver device to determine a measurement result; and calibrating at least one joint signal path mismatch according to the measurement result for a multiple antenna beamforming system operating on the wireless transceiver device;

wherein the at least one circuit loopback is disposed inside an integrated circuit and comprises the transmitter, inter-chip coupling/routing, and the receiver.

20. The method of claim 19, wherein the step of measuring the at least one joint signal response comprises:

using the transmitter to send at least one specific signal for calibration via the at least one circuit loopback;

using the receiver to receive the at least one specific signal via the at least one circuit loopback; and estimating the at least one joint signal response according to the received at least one specific signal.

21. The method of claim 20, wherein the at least one specific signal for calibration is at least one of a single-tone signal and a multi-tone signal.

22. The method of claim 20, wherein the step of sending the at least one specific signal for calibration is implemented by using at least one of a complex tone signal and a real tone signal.

23. The method of claim 22, wherein the step of receiving the at least one specific signal for calibration is implemented by using at least one of a quadrature oscillating signal and a single oscillating signal at receiver baseband.

24. The method of claim 19, wherein the at least one specific signal for calibration is a modulated signal generated by the transmitter.

25. The method of claim 24, wherein the step of measuring the at least one joint signal response comprises:

using a pattern generator for generating the modulated signal; and using a channel state indication detector for estimating a channel impulse response based on the modulated signal, so as to measure the at least one joint signal response; and the step of calibrating the at least one joint signal path mismatch comprises:

calibrating the at least one joint signal path mismatch according to the demodulated signal and the estimated channel impulse response.

26. The method of claim 19, wherein the at least one joint signal response comprises at least one of amplitude/phase/ delay response, a combination of amplitude and phase response, and any corresponding response combination.

27. A wireless transceiver device for performing beamforming calibration, comprising:

a transceiver integrated circuit, including:

a transmitter;

a receiver; and a calibration circuit, coupled to the transmitter and the receiver, for measuring at least one joint signal response of at least one circuit loopback from the transmitter to the receiver to determine a measurement result, and for calibrating at least one joint signal path mismatch according to the measurement result for a multiple antenna beamforming system operating on the wireless transceiver device;

wherein the at least one circuit loopback is disposed inside the transceiver integrated circuit and comprises the transmitter, inter-chip coupling/routing, and the receiver.

28. The wireless transceiver device of claim 27, wherein the calibration circuit is arranged for measuring the at least one joint signal response of a plurality of circuit loopbacks between a plurality of pairs of antenna elements within the wireless transceiver device.

29. The wireless transceiver device of claim 27, wherein the transmitter is arranged to send at least one specific signal for calibration via the at least one circuit loopback; the receiver is arranged to receive the at least one specific signal via the at least one circuit loopback; and, the calibration is arranged for estimating the at least one joint signal response according to the received at least one specific signal.

30. The wireless transceiver device of claim 29, wherein the at least one specific signal for calibration is at least one of a single-tone signal and a multi-tone signal.

31. The wireless transceiver device of claim 29, wherein the transmitter is arranged for sending the at least one specific signal for calibration by using at least one of a complex tone signal and a real tone signal.

32. The wireless transceiver device of claim 31, wherein the receiver is arranged for receiving the at least one specific signal for calibration by using at least one of a quadrature oscillating signal and a single oscillating signal.

33. The wireless transceiver device of claim 27, wherein the at least one specific signal for calibration is a modulated signal generated by the transmitter.

34. The wireless transceiver device of claim 33, wherein the transmitter comprises a pattern generator for generating the modulated signal; the receiver comprises a channel state indication detector for estimating a channel impulse response based on the modulated signal; and, the calibration circuit calibrates the at least one joint signal path mismatch according to the demodulated signal and the estimated channel impulse response.

35. The wireless transceiver device of claim 27, wherein the at least one joint signal response comprises at least one of amplitude/phase/delay response, a combination of amplitude and phase response, and any corresponding response combination.

* * * * *